US006020851A

United States Patent [19]

Busack

[11] Patent Number: 6,020,851

[45] Date of Patent: Feb. 1, 2000

[54] AUTO RACE MONITORING SYSTEM

[76] Inventor: Andrew J. Busack, 108 Freeze St., Concord, N.C. 28025

[21] Appl. No.: 08/944,306

[22] Filed: Oct. 6, 1997

[51] Int. Cl.[7] .............................. G01S 3/02; G08G 1/123

[52] U.S. Cl. ........................ 342/457; 340/991; 340/323 R

[58] Field of Search .................................... 342/457, 357; 340/991, 323 R

[56] References Cited

U.S. PATENT DOCUMENTS

| | | | |
|---|---|---|---|
| 5,299,130 | 3/1994 | Ono | 364/424.02 |
| 5,666,101 | 9/1997 | Cazzani et al. | 340/323 R |
| 5,696,706 | 12/1997 | Morton et al. | 364/565 |
| 5,731,788 | 3/1998 | Reeds | 342/357 |

*Primary Examiner*—Mark Hellner
*Attorney, Agent, or Firm*—Renner, Kenner, Greive, Bobak, Taylor & Weber

[57] ABSTRACT

An auto race monitoring system provides a race track with a ground positioning system which includes at least three transmitters, transmitting signals to be received by at least a pair of receivers in each of the race cars. Those receivers instantaneously determine their position and, accordingly, exact position and attitude of the race car upon the race track. This information, along with data respecting race car parameters such as vehicle speed, engine temperature and oil pressure, are sent by means of a transmitter to a receiver interconnected with a main frame computer which uses such information to replicate each of the vehicles in the race in real time. The replicated information is made available to the internet and the audio/video receivers connected thereto. Accordingly, a viewer can select any particular race car which he desires to monitor at any particular time in the race and not only view a replication of that vehicle, but also monitor vehicle parameters and listen in on communications between the driver and pit crew.

8 Claims, 1 Drawing Sheet

AUTO RACE MONITORING SYSTEM

TECHNICAL FIELD

The invention herein resides in the art of monitoring devices and systems. More particularly, the invention relates to a system for real time monitoring of all of the race cars in an auto race. Specifically, the invention allows the user to select a desired vehicle to monitor during the race and to switch from one vehicle to another during the race, obtaining the perspective of the race from each such vehicle.

BACKGROUND ART

Auto races are extremely popular throughout the country. Often, these races are viewed by fans through television broadcasts. However, such broadcasts only allow the viewer to actual see those cars which are focused upon by the video camera. Typically, only the lead cars are the focus of the broadcaster's attention. Those who follow auto racing, however, are more interested in the activities of their favorite driver, than in only the pack leading the race. As a consequence, some viewers many only be able to see their favorite car and racer once or twice during an entire race if that car is not fortunate enough to be among the leaders in the race.

Moreover, present viewing systems for car races are limited to the amount of information available to the viewer. For instance, data respecting the operation of the car, such as instantaneous vehicle speed, engine temperature and oil pressure are typically not known to the television viewer. Moreover, the ability of the viewer to "listen in" on conversations between a driver and his pit crew are typically limited to a selected few drivers who are either appropriately equipped for such monitoring, or who are of particular interest to the broadcaster.

There is a need in the art for those who closely follow auto racing to provide a means for selective real time monitoring of any of the cars in a race during the race. Moreover, there is a need in the art for such a system which allows the viewer to not only visually follow his selected car and driver throughout the race, but which also allows the viewer to monitor some of the physical parameters of the race car, such as speed, oil pressure, fuel remaining and engine temperature, and which also would accomodate listening in on communications from the driver and his pit crew.

DISCLOSURE OF INVENTION

In light of the foregoing, it is a first aspect of the invention to provide an auto race monitoring system which allows a viewer to select a particular vehicle for viewing during the race, and to change that selection throughout the race.

Another aspect of the invention is to provide an auto race monitoring system which, in real time, provides instantaneous information regarding each of the cars in the race.

Still a further aspect of the invention is the provision of an auto race monitoring system in which an accurate replication of each vehicle is made during the race, in real time, and is provided along with information respecting the various operational parameters of the race car, such as speed, engine temperature and oil pressure.

Yet an additional aspect of the invention is to provide an auto race monitoring system which provides for replicating not only the position of a race car on a race track, but its attitude on that track.

Still an additional aspect of the invention is the provision of an auto race monitoring system which provides for broadcasting and presenting a race upon the internet.

Yet another aspect of the invention is the provision of an auto race monitoring system which is capable of operating in real time in an accurate and reliable manner and which is conducive to implementation with state of the art apparatus and capabilities.

The foregoing an other aspects of the invention which will become apparent as the detailed description proceeds are achieved by an auto race monitoring system, comprising: a race track; a plurality of first transmitters fixed in relation to said race track; a plurality of race cars upon said track, each race car having at least a first receiver in communication with said first transmitters, said first receiver establishing its instantaneous position as a function of said communication with said first transmitters; a second transmitter in each said race car receiving data from said first receiver as to its instantaneous position and transmitting said data; a second receiver in communication with said second transmitter, said second receiver receiving said data as to instantaneous position; and a computer connected to said receiver and receiving said data.

DESCRIPTION OF THE DRAWINGS

For a complete understanding of the objects, techniques and structure of the invention reference should be made to the following detailed description and accompanying drawings wherein:

FIG. 2 is an illustrative side elevational view of a race car employing certain of the monitoring apparatus required by the invention.

BEST MODE FOR CARRYING OUT THE INVENTION

Figure 1:
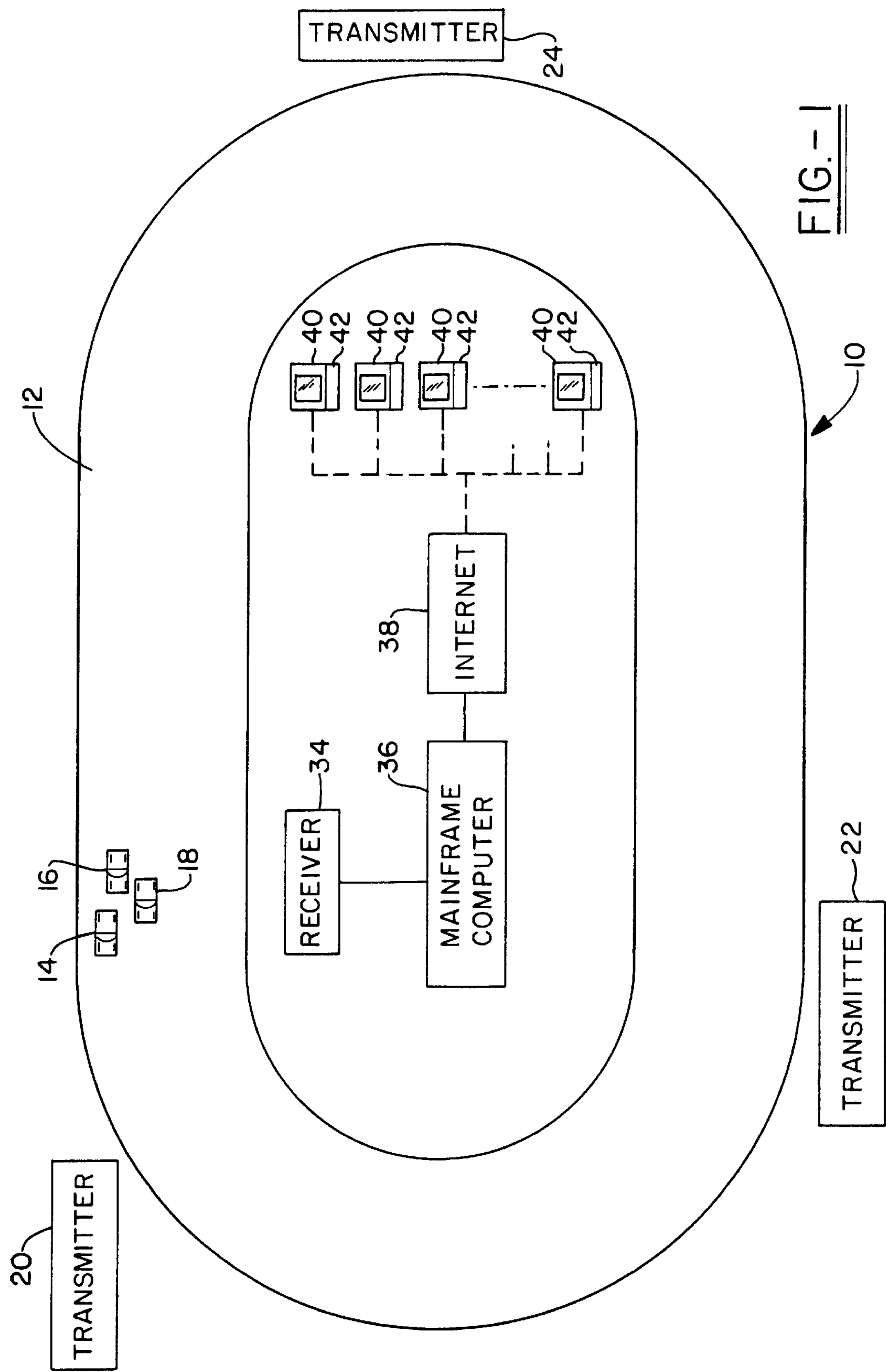
FIG. 1 is an illustrative top plan view of a race track monitoring system made in accordance with the invention.

Referring now to the drawings and more particularly to FIG. 1, it can be seen that a race track monitoring system according to the invention is designated generally by the numeral 10. The system 10 includes a race track 12, which is shown as being of oval geometry, but which can be of any of various configurations. Shown upon the race track 12 are a plurality of race cars 14, 16, 18, only three of which are being shown for purposes of illustration. Those skilled in the art will appreciate that a typical race track would often include 30–40 such race cars.

Fixed in position to the race track 12 is a ground positioning system comprising transmitters 20, 22, 24. The ground positioning system 20-24 is basically a rudimentary Global Positioning System (GPS), now commonly known and widely used. The transmitters 20, 22, 24 present output signals from their fixed location which are received by a pair of receivers 26, 28 in each of the race cars, as shown in FIG. 2. Each of the receivers 26, 28 can generate a signal corresponding to an instantaneous location based upon mathematical triangulation of the signals received from the transmitters 20, 22, 24. It will be appreciated that with two such receivers 26, 28, the actual instantaneous attitude of the race car can also be determined upon the track 12. In other words, if the car begins to "fishtail," go into a skid, or slide sideways, that specific attitude of the car upon the track can be determined with knowledge of the instantaneous positions of the forward receiver 26 and rearward receiver 28.

Also received within each of the race cars is a data acquisition chip 30 which is interconnected with the various monitors and diagnostic systems of the race car. By way of example only, the data acquisition chip may acquire information respecting the instantaneous speed of the vehicle, engine temperature, remaining fuel, oil pressure, ignition efficiencies, and the like. Moreover, the data acquisition chip 30 may also provide a means for verbal communication with the driver for ultimate transmission to the pit crew of the race car.

As is further shown in FIG. 2, the GPS receivers 26, 28 and the data acquisition chip 30 are all interconnected through a transmitter 32 for transmitting all of the data associated with the receivers 26, 28 and data acquisition chip 30 to a stationary receiver 34 maintained at the race track 12, as shown in FIG. 1. The data so received is passed to a main frame computer 36 which uses the data to replicate each of the race cars in the race as to its instantaneous position and attitude on the race track 12. It also provides in association with each race car other information such as instantaneous speed, oil pressure, engine temperature, and engine performance. Moreover, it also receives voice transmissions between the race car driver and the associated pit crew for transmission, as desired. Accordingly, the computer 36 can replicate the entire field of the race, or can isolate on selected areas of that field.

The main frame computer 36 is interconnected with the internet (World Wide Web) 38, providing the capability of transmitting to any of the audio/video receivers 40 which made access to the internet. Each of the audio/video receivers 40 has an associated keyboard 42 by which the user can select any desired vehicle for monitoring during any point in the race and through which specific data requests can be made, such as speed, temperature and pressure.

It should now be apparent that the concept of the invention allows race car enthusiasts to monitor an auto race from the perspective of any particular selected driver or car. Moreover, it allows the viewer to enjoy the race from the perspective of any particular race car in real time, and to monitor other information regarding the race car which would not even be available to those viewing the race at a race track. The use of the ground positioning system and standard mathematical triangulation techniques allows for constant and instantaneous positioning of each of the race cars upon the track, as well as the attitude of each such race car. The utilization of a pair of GPS receivers 26, 28, positioned at the forward and rearward positions of the vehicle, allow for such monitoring and determination.

Thus it can be seen that the objects of the invention have been satisfied by the structure presented above. While in accordance with the patent statutes only the best mode and preferred embodiment of the invention has been presented and described in detail, it will be understood that the invention is not limited thereto or thereby. Accordingly, for an appreciation of the true scope and breadth of the invention reference should be made to the following claims.

What is claimed is:

1. An auto race monitoring system, comprising:

a race track;

a plurality of first transmitters fixed in relation to said race track;

a plurality of race cars upon said track, each race car having at least a first receiver in communication with said first transmitters, said first receiver establishing its instantaneous position as a function of said communication with said first transmitters; a second transmitter in each said race car receiving data from said first receiver as to its instantaneous position and transmitting said data;

a second receiver in communication with said second transmitter, said second receiver receiving said data as to instantaneous position;

a computer connected to said receiver and receiving said data; and wherein each race car has a third receiver, spaced from said first receiver, said third receiver being in communication with said first transmitter and establishing its instantaneous position as a function of said communication, said second transmitter receiving said data and transmitting the same to said second receiver.

2. The auto race monitoring system according to claim 1, wherein said plurality of first transmitters comprise three such transmitters.

3. The auto race monitoring system according to claim 2, wherein each race car has a data acquisition member connected to said second transmitter and passing thereto data respecting vehicle speed, engine temperature, and oil pressure, said second transmitter passing said data to said second receiver.

4. The auto race monitoring system according to claim 3, where each of said first and third receivers establishes its instantaneous position by triangulation of signals received from said first transmitter.

5. The auto race monitoring system according to claim 4, wherein said computer receives data respecting instantaneous positions of said first and third receivers and said data respecting vehicle speed, engine temperature and oil pressure and generates a replication of said race cars upon said track.

6. The auto race monitoring system according to claim 5, wherein said computer is connected to the internet.

7. The auto race monitoring system according to claim 6, wherein a plurality of audio/video receivers are connected to said computer via the internet.

8. The auto race monitoring system according to claim 7, wherein each said audio/video receiver can selectively monitor any of said race cars during a race.

* * * * *